United States Patent
Kapanen et al.

(10) Patent No.: US 6,850,883 B1
(45) Date of Patent: Feb. 1, 2005

(54) DECODING METHOD, SPEECH CODING PROCESSING UNIT AND A NETWORK ELEMENT

(75) Inventors: Pekka Kapanen, Tampere (FI); Janne Vainio, Lempäälä (FI)

(73) Assignee: Nokia Networks Oy, Nokia Group (FI)

( * ) Notice: Subject to any disclaimer, the term of this patent is extended or adjusted under 35 U.S.C. 154(b) by 0 days.

(21) Appl. No.: 09/601,827

(22) PCT Filed: Feb. 9, 1998

(86) PCT No.: PCT/FI99/00097

§ 371 (c)(1), (2), (4) Date: Sep. 6, 2000

(87) PCT Pub. No.: WO99/40569

PCT Pub. Date: Aug. 12, 1999

(30) Foreign Application Priority Data

Feb. 9, 1998 (FI) .................................................. 980298

(51) Int. Cl.[7] .............................................. G10L 19/00
(52) U.S. Cl. ........................ 704/212; 704/219; 704/220
(58) Field of Search ................................ 704/212, 220, 704/219, 222, 223, 230

(56) References Cited

U.S. PATENT DOCUMENTS

| | | | | |
|---|---|---|---|---|
| 4,918,729 A | * | 4/1990 | Kudoh | 704/226 |
| 5,113,400 A | * | 5/1992 | Gould | 714/795 |
| 5,166,981 A | * | 11/1992 | Iwahashi | 704/230 |
| 5,258,995 A | * | 11/1993 | Su | 375/354 |
| 5,483,619 A | | 1/1996 | Blanchard | |
| 5,487,087 A | | 1/1996 | McCree et al. | |
| 5,749,065 A | * | 5/1998 | Nishiguchi | 704/200.1 |
| 5,771,440 A | * | 6/1998 | Sukhu | 455/63.1 |
| 5,953,666 A | * | 9/1999 | Lehtimaki | 455/439 |
| 5,960,389 A | * | 9/1999 | Jarvinen | 704/220 |
| 6,269,331 B1 | * | 7/2001 | Alanara | 704/205 |

FOREIGN PATENT DOCUMENTS

| | | | |
|---|---|---|---|
| EP | 0 843 301 A2 | 5/1998 | ............ G10L/3/02 |
| EP | 0 843 301 A3 | 5/1999 | ............ G10L/3/02 |
| WO | 96/32823 | 10/1996 | ............ H04Q/7/30 |

* cited by examiner

*Primary Examiner*—Richemond Dorvil
*Assistant Examiner*—Kinari Patel
(74) *Attorney, Agent, or Firm*—Cohen, Pontani, Lieberman & Pavane (57) ABSTRACT

This invention is related to tandem free operation (TFO) in mobile cellular systems. The present invention implements a tandem free operation by using a special feedback loop which makes the decoded parameters available, performs the comfort noise insertion and bad frame handling operations, produces the parameter quantisation indices corresponding to the output of these operations, and synchronises the speech encoders and the speech decoders in the transmission path from the uplink mobile station to the downlink mobile station. This functionality is realized by partly decoding and re-encoding the parameters and synchronising and resetting the quantiser prediction memories in a specific manner. A basic idea of the invention is, that during BFH and CNI processes, a re-encoding block produces models of encoded speech parameters from the BFH/CNI processed speech parameters. These models of encoded speech parameters are then transmitted to the receiving end. The present invention provides a solution to the problem created by predictive, more generally non-stateless encoders in TFO operation.

16 Claims, 5 Drawing Sheets

DECODING METHOD, SPEECH CODING PROCESSING UNIT AND A NETWORK ELEMENT

PRIORITY CLAIM

This is the U.S. national stage of international PCT Application No. PCT/FI99/00097, filed on Feb. 09, 1999. Priority is claimed from that application and the priority document cited in that application, namely, Finnish Patent Application No.:980298, filed Feb. 9, 1998.

TECHNICAL FIELD OF THE INVENTION

This invention is related to tandem free operation (TFO) in mobile cellular systems. The invention is further related to that, which is stated in the preamble of claim 1.

BACKGROUND OF THE INVENTION

For convenience, various abbreviations used in this specification are presented here:

| | |
|---|---|
| TFO | Tandem Free Operation |
| CNI | Comfort Noise Insertion |
| CN | Comfort Noise |
| BFH | Bad Frame Handling |
| UMS | Uplink Mobile Station |
| DMS | Downlink Mobile Station |
| UBS | Uplink Base Station |
| UTR | Uplink Transcoder |
| DTR | Downlink Transcoder |
| DBS | Downlink Base Station |
| AI | Air Interface |
| PCM | Pulse Coded Modulation |
| PSTN | Public Switched Telephone Network |
| UAI | Uplink Air Interface |
| DAI | Downlink Air Interface |
| DTX | Discontinuous Transmission |
| VAD | Voice Activity Detection |

Speech frames received by the mobile network from a mobile communication means can be roughly classified into three classes: a) uncorrupted, i.e. good speech frames; b) corrupted speech frames; and c) frames generated during discontinued transmission (DTX) mode, which frames generally include silence descriptor (SID) frames and unusable frames received during the transmission pause.

In normal mode of operation, a mobile unit encodes the speech to be transmitted, and the encoded speech is decoded after transmission through the air interface. When a mobile unit receives a call, the speech is encoded at the network side of the air interface, and decoded in the receiving mobile unit. Therefore, in normal mode of operation without special arrangements taking place, speech is encoded and decoded twice in a mobile-to-mobile call, resulting in a decrease of perceived speech quality. Tandem free operation (TFO) is a mode of operation between two mobile units, in which the speech is encoded only once, and the speech is transmitted in the encoded form over the network to the receiving mobile unit.

Since it is not feasible to send the error indication information contained in erroneous frames and the side information contained in DTX frames through the mobile network to the receiving end, it has been found feasible in GSM to transmit during TFO operation all frames over the A-interface as good frames. The A-interface is the interface between the transmitting and receiving mobile networks. In conventional non-TFO operation, the speech is transmitted over the A-interface as a digital real-time waveform as PCM-coded samples.

A so-called bad frame handling procedure is used in converting erroneous frames received from the mobile communication means to good frames for transmission over the A-interface. In order to send comfort noise information contained in DTX frames over the A-interface, the comfort noise information has to be converted into good speech frames for transmission over the A-interface.

Comfort noise insertion is discussed first in more detail in the following paragraphs, then bad frame handling.

Comfort Noise Insertion

In Discontinuous Transmission (DTX), a Voice Activity Detector (VAD) detects on the transmit side whether or not the user is speaking. When the user is speaking, speech parameters descriptive of the input speech are produced in the speech encoder for each frame and transmitted to the receiving end. However, when the user stops speaking, parameters descriptive of the prevailing background noise are produced and transmitted to the receive side instead of the speech parameters. After this, the transmission is switched off. The transmission is resumed at the normal transmission rate when the user starts speaking again, or at a low rate to update the parameters describing the background noise while the user does not speak in order to adapt to changes occurring in the prevailing background noise during the transmission pause. Throughout this text, these parameters describing the prevailing background noise are referred to as comfort noise parameters or CN parameters.

At the receiving end, speech is synthesised whenever good speech parameter frames are received. However, when comfort noise parameters have been received, after which the transmission has been switched off, the speech decoder uses the received comfort noise parameters to locally synthesise noise with characteristics similar to the background noise on the transmit side. This synthetic noise is commonly referred to as Comfort Noise (CN), and the procedure of generating CN locally on the receive side is commonly referred to as Comfort Noise Insertion (CNI).

The updated comfort noise parameters are applied to the CNI procedure either immediately when received, or by gradually interpolating frame-by-frame from the previously received comfort noise parameter values to the updated parameter values. The former method guarantees that the comfort noise parameters are always as fresh as possible. However, the former method may result in stepwise effects in the perceived CN characteristics, and thus the latter method of interpolation is often used to alleviate this inconvenience. The latter method has the drawback in that the interpolation of the received comfort noise parameters introduces some delay in characterisation of the prevailing background noise, thereby introducing some contrast between the actual background noise and the CN.

Details of comfort noise insertion are described in the ETSI specification ETS 300 580-4, "European digital cellular telecommunications system (Phase 2); Comfort noise aspect for full rate speech traffic channels (GSM 06.12)", September 1994, which is hereinafter called the GSM 06.12 specification.

Bad Frame Handling

Bad frame handling (BFH) refers to a substitution procedure for frames containing errors. The purpose of the frame substitution is to conceal the effect of corrupted frames, since normal decoding of corrupted or lost speech frames would result in very unpleasant noise effects. In order to improve the subjective quality of the received speech, the first lost speech frame is substituted with either a repetition or an extrapolation of the previous good speech frames. Corrupted speech frames are not transmitted to the receiving end. If a number of consecutive frames is lost, the output of the speech decoder is gradually muted in order to indicate the user about the problems in the connection. The frame substitution procedure is discussed in the ETSI specification draft pr ETS 300 580-3, "Digital cellular telecommunications system; Full rate speech; Part 3: Substitution and muting of lost frames for full rate speech channels (GSM 06.11 version 4.0.5)", November 1997, which is hereinafter called the GSM 06.11 specification.

Mobile to Mobile Calls

In the following, the flow of the speech data during a normal, non-TFO connection is discussed. The case of TFO operation is discussed after that.

Figure 1:
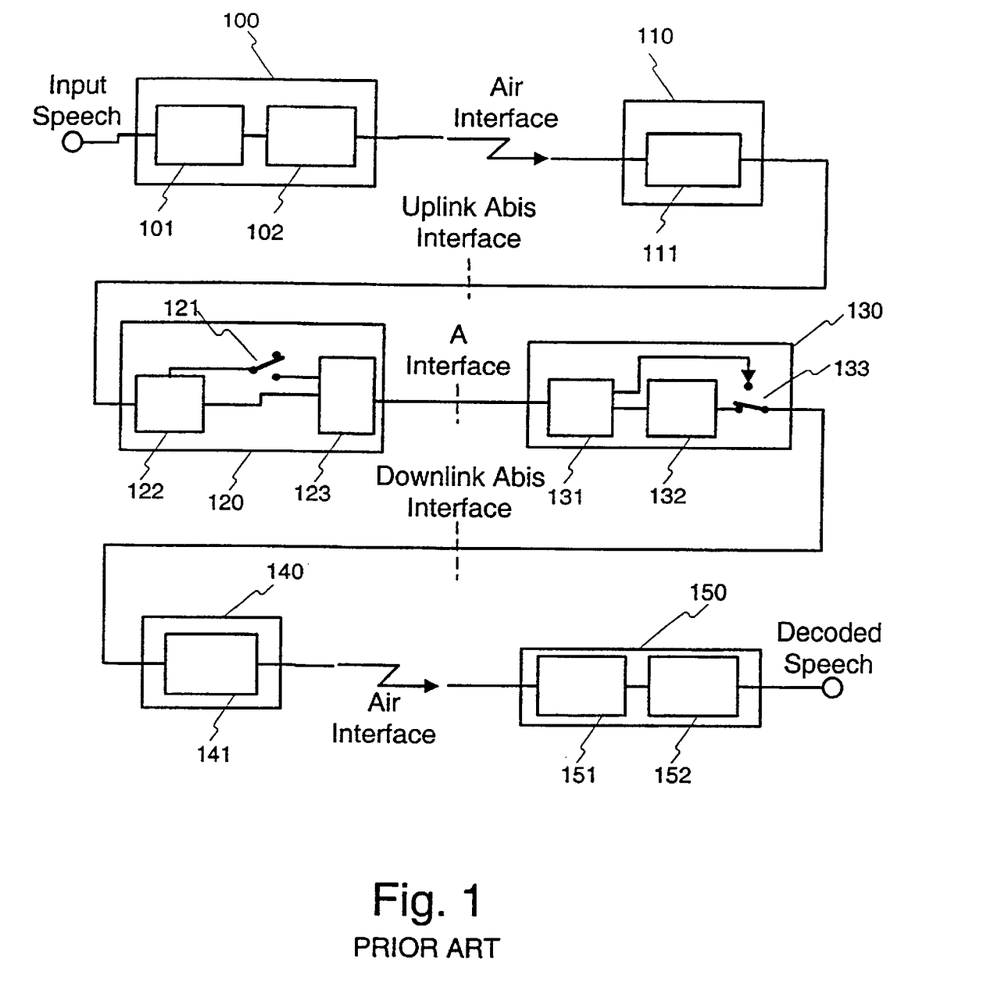
FIG. 1 illustrates the data flow of a mobile to mobile call according to prior art.

The basic block diagram of the mobile to mobile call is illustrated in FIG. 1. In an Uplink Mobile Station (UMS) 100, i.e. the mobile station in the transmitting end, the time-domain waveform is first divided into fixed-length frames and speech encoded in a speech coding block 101, i.e., transformed to speech coding parameters, which are then channel encoded in a channel coding block 102 by inserting redundant information for error correction purposes. These protected speech frames are then transmitted over the air interface (AI).

In an Uplink Base Station (UBS) 110, the channel decoding is performed in the channel decoding block 111, i.e., the channel errors are corrected and the redundant information is removed from the speech coding parameters. The speech coding parameters are transmitted through a serial Uplink Abis interface to an Uplink Transcoder (UTR) 120, where the speech coding parameters are transformed to a digital time-domain speech waveform in a speech decoding block 122. In normal non-TFO mode, the switch 121 is open as shown in FIG. 1; and the speech waveform is passed through a TFO packing block 123 essentially unchanged. The output of the UTR is transmitted through the A-interface to a public switched telephone network (PSTN) or to another mobile telephone network.

In a Downlink Transcoder (DTR) 130, the time-domain waveform is received from the A-interface. In non-TFO-operation, the switch 133 connects the output of the speech encoding block 132 to the output of the DTR, and the TFO extracting block 131 passes through the time-domain waveform unchanged. The waveform is transformed to speech coding parameters in the speech encoding block 132. The speech coding parameters are forwarded to the Downlink Abis interface.

In the downlink base station (DBS) 140, the speech parameters received from the Downlink Abis interface are channel encoded in the channel encoding block 141. The channel encoded parameters are transmitted to a Downlink Mobile Station (DMS) 150, i.e. the receiving mobile station. In the DMS, the channel coding is removed in a channel decoding block 151 and the speech coding parameters are transformed back to a time-domain waveform, i.e. decoded speech, in the speech decoding block 152.

The problem in the conventional mode described above is the negative effect of two consecutive encodings on the quality of the transmitted speech signal. Since the encoding of the waveform in the speech encoding block 132 of the Downlink Transcoder (DTR) 130 is the second successive compression to the original input signal, the parameters in the output of the speech encoder 132 of the DTR 130 represent a time-domain waveform which is not a very accurate reproduction of the original speech waveform due to the errors created in two compressions. The tandem-free operation (TFO) was designed to alleviate this problem in at least some cases.

Tandem-Free Operation

In a mobile station to mobile station telephone call utilising a tandem-free mode of operation, hereinafter referred to as TFO, speech is transmitted by sending the parameters representing the time-domain speech waveform from an uplink mobile station speech encoder directly to a downlink mobile station speech decoder, without converting the parameters into a time-domain speech waveform in between the uplink transcoder and the downlink transcoder.

This significantly improves the speech quality because without TFO, the original speech signal is coded twice with the lossy speech compression algorithm which degrades the speech quality each time the compression is applied. The difference between the single encoding and the tandem encoding becomes even more important when the bit-rate of a speech codec is very low. The old high bit-rate speech coding standards, as exemplified by the G.711 standard of 64 kbit/s PCM coding, are very robust to successive coding. However, the state of the art speech coders operating in a range of 4 kbit/s to 16 kbit/s are quite sensitive to more than one successive coding.

The tandem-free operation according to prior art is discussed in the following with reference to FIG. 1. In tandem-free operation, the speech parameters received by the speech decoding block 122 of the uplink transcoder 120 are embedded into the least significant bits of the decoded speech waveform in the TFO packing block 123, which is indicated in FIG. 1 by the closed position of the switch 121. The speech waveform with the embedded speech parameters is then forwarded to the A-interface.

In order to enable the TFO mode, the downlink end of the call must naturally be in a mobile telephone network using the same speech coding standard as the uplink end. However, the call may be forwarded from the A-interface through several digital transmission links to the downlink mobile telephone network.

In the receiving end, the speech waveform with the embedded speech parameters is received from the A-interface by the downlink transcoder 130. The TFO extracting block 131 extracts the embedded speech parameters from the speech waveform. In TFO operation, the switch 133 connects the output of the TFO extracting block to the output of the downlink transcoder. The extracted original parameters are then forwarded to the downlink Abis interface and further via the downlink base station 140 through the air interface to the downlink mobile station, whose speech decoding block 152 then decodes the original speech parameters as encoded by the speech encoding block of the uplink mobile station 100.

Sometimes there are detected and undetected errors in the Air interface. These errors and the BFH operations can cause some mismatch between the parameters of speech encoder 101 of the transmitting mobile station and speech decoder 152 of the receiving mobile station. Usually these mismatches are diminished after the correct parameters have been received for several consecutive frames.

BFH and CNI Handling in Tandem Free Operation

Usually the functionality for bad frame handling and comfort noise insertion in the transmitting end is located in the speech decoder block 122 of the uplink transcoder 120. These functions are not illustrated in FIG. 1. When any speech frames are corrupted or lost, or DTX transmission pauses occur, the speech decoder block 122 generates speech coding parameters corresponding to these situations as described previously.

As can be observed from FIG. 1, the UMS 100, UBS 110, DBS 140 and the DMS 150 are not involved in the TFO operations concerning the BFH and CNI, but operate transparently as in the non-TFO case. The speech encoder 132 of the DTR operates normally during TFO as well, except that its output is not forwarded to the downlink Abis interface, but is replaced with the speech coding parameters extracted from the A-interface stream instead. The operations concerning the BFH and CNI take place in the speech decoder 122 of the UTR 120.

Figure 2:
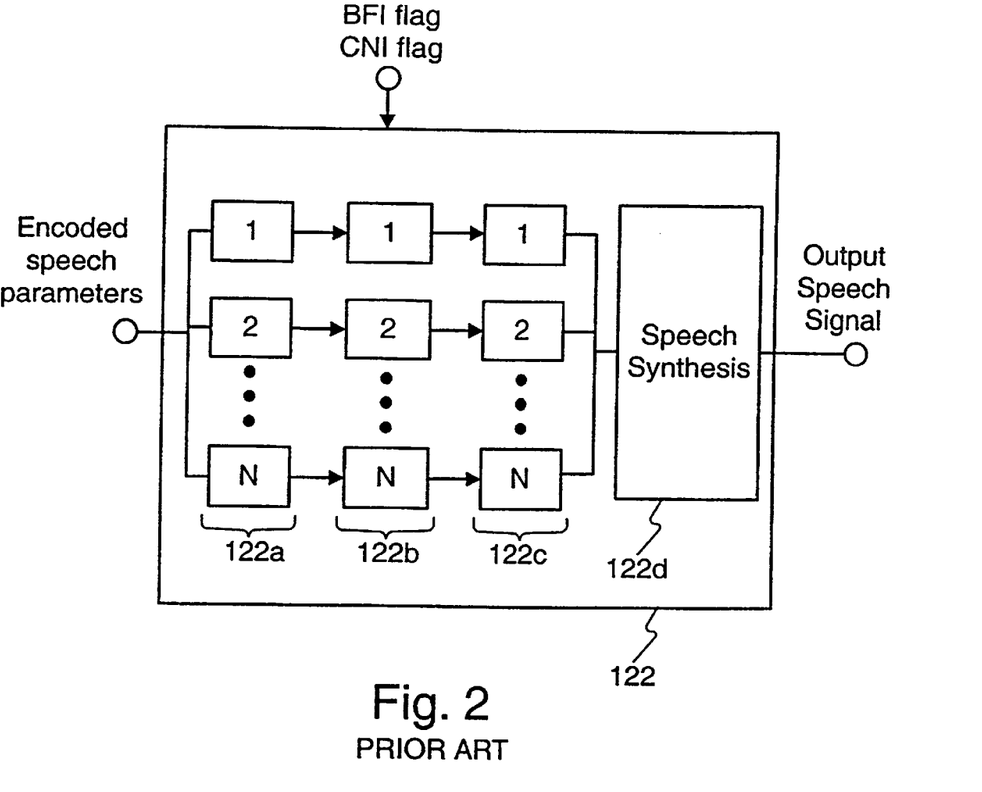
FIG. 2 shows a block diagram of a prior art speech decoder.

A more detailed block diagram of the prior art speech decoder 122 realizing the CNI and BFH functions is shown in FIG. 2. The encoded speech parameters, i.e. the parameter quantisation indices are extracted from the received information stream in parameter extracting blocks 122a. The BFH and CNI operations are performed on these parameter quantisation indices in BFI/CNI blocks 122b prior to the dequantisation (decoding) of the indices in dequantisation blocks 122c. After dequantisation, the parameters are used in speech synthesis in a speech synthesis block 122d to produce the decoded output signal. The BFI and CNI flags are signals produced by the uplink base station 110, which signals inform the decoder 122 about corrupted and DTX frames. The BFI/CNI blocks 122b are controlled by the BFI and CNI flags.

Figure 3:
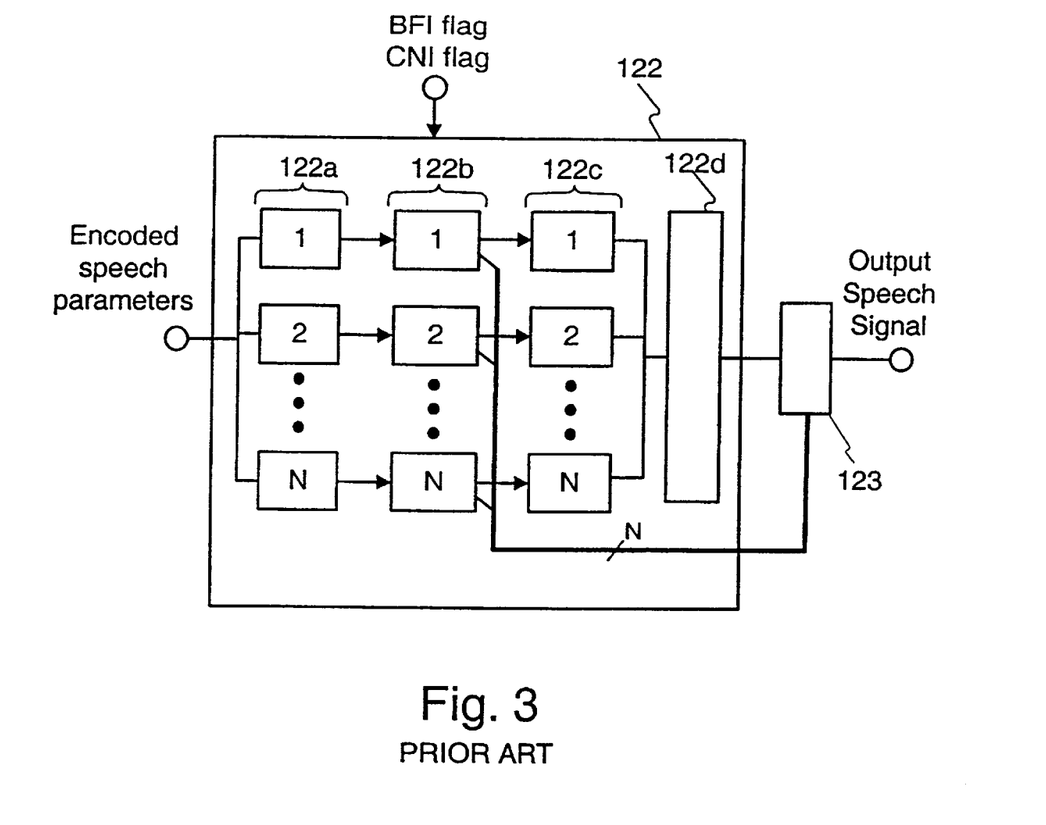
FIG. 3 shows a block diagram of a prior art speech decoder with TFO and CNI/BFH functionality.

A similar block diagram with prior art TFO functionality is shown in FIG. 3, which shows a diagram of the speech decoder 122 of an UTR 120 as well as the TFO packing block 123. As can be observed from FIG. 3, the CNI and the BFH operations are performed on the parameter quantisation indices in the speech decoder 122. Therefore the tandem free operations in the UTR 120 are simply effected by packing (embedding) of the already available parameters from the decoder 122 into the time-domain waveform signal.

BFH operations during tandem free operation are straightforward, and can be effected in the same way as in non-TFO mode. The GSM 06.11 specification contains an example prior art solution of the BFH functionality, which can also be used during tandem free operation. The CNI operations are simple because the quantisations are memoryless, which means that all information during comfort noise generation or in the transitions between active speech and comfort noise is contained in the currently transmitted parameters. There are no problems for example in the resetting of the different parts of the transmission path. The prior art CNI solution is described in the specification GSM 06.12.

In tandem free operation, the parameter information packed to the signal transmitted to the A-interface must include all information needed to produce good speech frames, since the downlink mobile station is not aware of the CNI-operation at the uplink end. Due to this requirement, a simple conversion is performed on the comfort noise parameters to convert them to speech parameter frames. This involves storing the most recent comfort noise parameters, and repeatedly forwarding them to the A-interface stream until updated comfort noise parameters are received and stored, or until active speech parameters are received. In case comfort noise parameter interpolation is desired as discussed earlier, this interpolation can be performed prior to forwarding the parameters to A-interface stream. Since comfort noise parameters do not include all parameters present in a good speech parameter frame, these missing speech parameters need to be created in some way during the conversion process.

Problems Inherent in the Prior Art Solutions

FIG. 3 shows a decoder using conventional non-predictive quantisers. When the quantisers of the decoder are non-predictive as in FIG. 3, BFH and CNI processing of the parameters do not create any problems. However, it is predictive quantisers that are used in the state of the art low rate encoders and decoders.

In a state of the art speech codec employing predictive quantisers, comfort noise insertion and bad frame handling operations have to be performed using the dequantised (decoded) parameters in the speech decoder, i.e. after the dequantiser blocks 122c and not before them as shown in FIG. 3. The reason for this is that in predictive quantising and dequantising, the quantised entities (in this case, speech parameters) are not independent. When evaluating (decoding) predictively quantised entities, the evaluation result for each evaluated entity does not depend only on the quantised entity under evaluation, but also on the previous entities. Therefore, simple substitution of corrupted encoded parameters to suitable CN or BFH parameters is not possible. The substitution would have to adjust the substituting CN or BFH parameters according to the previously received good parameters, but since there is no knowledge of the development of the signal during the transmission pause or disturbance, the next good parameters received would depend on another history than that generated in the decoder, resulting in very annoying sound artifacts at the end of the pause. Therefore, CNI and BFH operations are effected after predictive dequantization on the decoded speech parameters, and coded speech parameters corresponding to CNI or BFH blocks are not available. Since the coded parameters describing CNI or BFH blocks are not available, they cannot be embedded in the time-domain speech waveform along with the rest of the coded parameters. Because of this problem, CNI and BFH operations are not possible in prior art tandem free operation, when the uplink mobile station uses a speech codec with predictive quantisers.

SUMMARY OF THE INVENTION

The object of the invention is to realize a method for implementing CNI and BFH operations in tandem free operation with predictively quantized speech parameters. A further object of the invention is to realize a speech decoder capable of CNI and BFH operations in connection with decoding of predictively quantized speech data in tandem free operation.

The objects are reached by producing re-encoded speech parameters from the dequantised BFH/CNI processed speech parameters, and transmitting these re-encoded parameters to the receiving end during BFH and CNI procedures.

The method according to the invention is characterized by that, which is specified in the characterizing part of the independent method claim. The speech coding processing unit according to the invention is characterized by that, which is specified in the characterizing part of the independent claim directed to a speech coding processing unit. The telecommunications network element according to the invention is characterized by that, which is specified in the characterizing part of the independent claim directed to a telecommunications network element. The dependent claims describe further advantageous embodiments of the invention.

The present invention implements a tandem free operation by using a special feedback loop which makes the decoded parameters available, performs the comfort noise insertion and bad frame handling operations, produces the parameter quantisation indices corresponding to the output of these operations, and synchronises the speech encoders and the speech decoders in the transmission path from the uplink mobile station to the downlink mobile station. This functionality is realized by partly decoding and re-encoding the parameters and synchronising and resetting the quantiser prediction memories in a specific manner. The present invention provides a solution to the problem created by predictive, more generally non-stateless encoders in TFO operation.

BRIEF DESCRIPTION OF THE DRAWINGS

The invention is described in more detail in the following with reference to the accompanying drawings, of which

Same reference numerals are used for similar entities in the figures.

DETAILED DESCRIPTION

Figure 4:
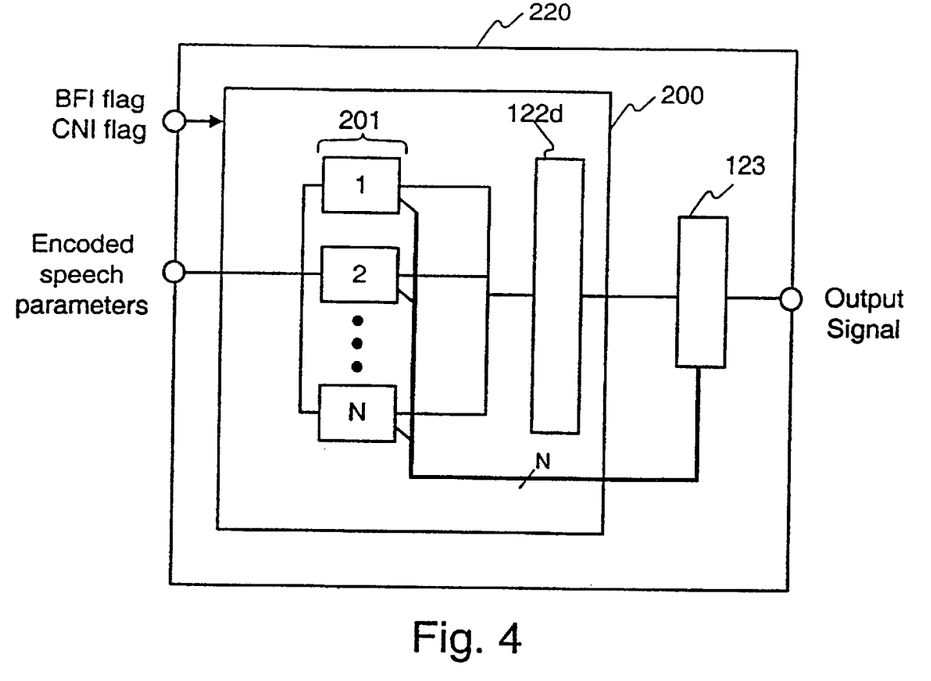
FIG. 4 shows a block diagram of a network element according to an advantageous embodiment of the invention.
Figure 5:
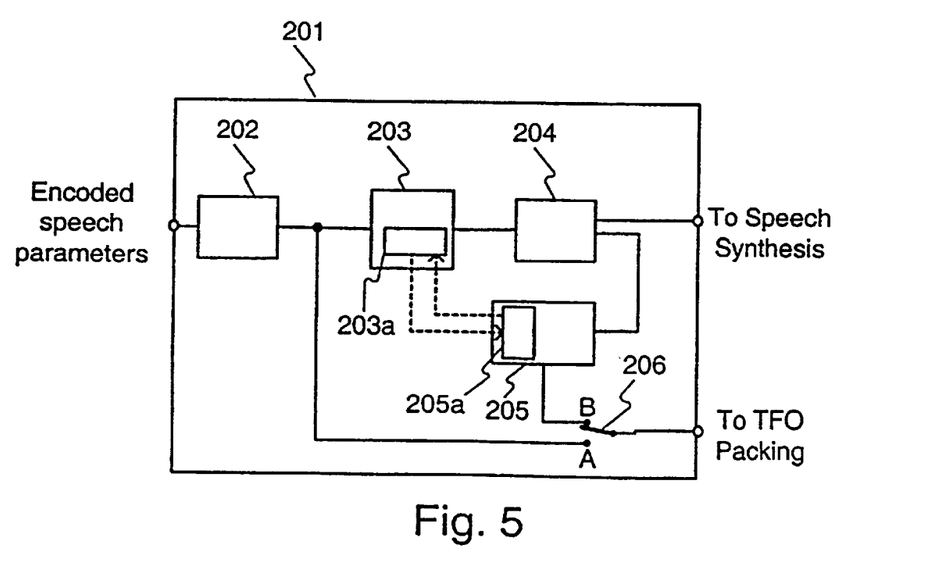
FIG. 5 shows a block diagram of a speech coding processing block of a speech speech coding processing unit according to an advantageous embodiment of the invention.

A block diagram of a network element 220 such as, for example, an uplink transcoder or a speech coding processing unit, according to an advantageous embodiment of the invention is presented in FIG. 4, and a speech coding processing block 201 according to an advantageous embodiment of the invention is presented in FIG. 5. As can be observed from FIG. 4, the network element comprises a speech decoder 200 and a TFO packing block 123. The network element receives from other elements located before the element in the transmission path encoded speech parameters and signals, such as a BFI flag and a CNI flag indicating various breaks in the signal flow, and produces an output signal comprising a time domain speech signal and, optionally, embedded encoded speech parameters. Further, in this embodiment the functions of blocks 122a, 122b, 122c of the prior art decoder are realized in speech coding processing blocks 201 according to the present invention. Such a speech coding processing block 201 is illustrated in FIG. 5. In this exemplary embodiment, the outputs, inputs and the speech synthesis block 122d are similar to those of a prior art decoder 122 described previously, and are not described here in further detail. The speech coding processing block 201 comprises a parameter extraction block 202, a predictive dequantiser block 203, a BFH/CNI processing block 204 and a predictive quantiser block 205. The dequantiser and quantiser blocks further have memories 203a, 205a.

The operation of a single speech coding processing block 201 according to FIG. 5 is discussed in the following. Normal TFO operation is described first, i.e. operation between DTX pauses when no frames are corrupted in the uplink AI, secondly bad frame handling during TFO operation, and finally comfort noise insertion during TFO operation.

Normal TFO Operation

In normal TFO operation, a parameter extraction block 202 extracts the desired parameters from the incoming frames of encoded speech parameters. The extracted encoded parameters are forwarded to a predictive dequantiser block 203, which dequantises the encoded parameters using information about previous dequantised parameters stored in the memory 203a of the dequantiser block 203. The dequantized parameters are forwarded to a BFH/CNI processing block 204, which in normal TFO operation forwards the parameters unchanged to speech synthesis. The extracted parameters from the parameter extraction block 202 are forwarded to TFO packing, which is represented by the position A of the switch member 206. In the present invention, an additional purpose of the decoding process is to provide correct initial values for the re-encoding quantiser block 205 memory for bad frame handling and discontinuous transmission operation.

BFH Operation During TFO

In transitions from normal speech parameter transmission to BFH, the contents of the speech parameter dequantiser block memory 203a are copied to the quantiser memory 205a for proper initialisation of the re-encoding. This is represented by the arrow going from memory 203a to memory 205a.

In BFH operation, the BFH process is carried out on the decoded speech parameters produced by the predictive dequantiser block 203. The processed parameters are forwarded from the BFH/CNI processing block 204 to speech synthesis, and to the predictive quantiser block 205. The predictive quantiser block 205 re-encodes the dequantised and processed parameters to create new parameter quantisation indices and quantised parameters. The newly created re-quantised parameters are forwarded to TFO packing for transmission to the downlink end, which is represented by the position B of the switch member 206. Thereafter the contents of the quantisation memory 205a are copied to the memory 203a of the dequantiser block 203. The copying operation is represented by the dashed arrow going from memory 205a to memory 203a in FIG. 5. This copying operation results in the same state of the predictive dequantiser block 203, which would result, if the encoded parameters created by the quantising block 205 would in fact have been received from the uplink mobile station. Since the encoded parameters created by the quantising block 205 are forwarded via the TFO packing operation to the downlink mobile station, the speech decoder 200 of the UTR and the speech decoder 152 of the DMS are kept in synchronization.

CNI Operation During TFO

In transitions from normal speech parameter transmission to DTX, the contents of the speech parameter dequantiser block memory 203a are copied to the quantiser memory 205a for proper initialisation of the re-encoding. This is represented by the arrow going from memory 203a to memory 205a.

In discontinuous transmission (DTX) mode of operation, the predictive quantisation can not be performed in the usual manner by updating the quantiser memories in each frame. Therefore, the synchronisation of the quantiser memories must be ensured between the encoder of UMS and the decoder of UTR with special arrangements to allow quantisation of the comfort noise parameters. The solution used in the prior art GSM system can be presented as an example of a suitable synchronisation method. According to GSM specification of enhanced full rate (EFR) coding during DTX mode, the quantiser memories are synchronised between the mobile unit and the transcoder by freezing the memories to identical values in both the encoder and the decoder for quantisation of the comfort noise parameters. This synchronization is described in further detail in the ETSI specification EN 301 247 V4.0.1 (November 1997) "Digital cellular telecommunications system (Phase 2); Comfort noise aspects for Enhanced Full Rate (EFR) speech traffic channels", also known as GSM specification 06.62 version 4.0.1. However, the present invention is not limited to the example of the GSM system. Any other mechanisms for synchronising the quantiser memories between the encoder of UMS and the decoder of UTR can be used as well in various embodiments of the invention.

In DTX operation the comfort noise parameters are transmitted from the UMS encoder to the UTR decoder and decoded using the special arrangements described in the previous paragraph. In each frame during DTX, the following steps are performed. The comfort noise parameters are either repeated or interpolated, as described previously in connection with prior art CNI operation. After the decoding operation, the parameters are re-encoded using the predictive quantiser block 205 as in the BFH case, and the memory 205a of the quantiser block 205 is updated. The newly created re-quantised parameters are forwarded to TFO packing for transmission to the downlink end. In this way the speech decoder 200 of the UTR and the speech decoder 152 of the DMS are kept in synchronization, since the encoded parameters created by the quantising block 205 are forwarded via the TFO packing operation to the downlink mobile station.

When the transmission of normal speech frames is resumed after a period of discontinuous transmission, the predictive quantiser memories in the speech encoder of the uplink mobile station are started from their reset states. To reflect this operation to the other elements of the TFO connection, the following steps are performed. The dequantisation operation in the predictive dequantising block 203 are also started from the reset state. A re-encoding is performed to the decoded speech parameters during the first frame of normal speech to keep the memory 205a of the re-encoding quantiser block 205 of the UTR and the memory of the dequantiser block of the speech decoder of the DMS synchronised, to prevent any audibly annoying effects caused by loss of synchronisation.

For the re-encoding of this first speech frame, the quantiser 205 uses the memory contents left by the the last re-encoded comfort noise frame. After re-encoding, the contents of the quantiser block 205 memory 205a are copied to the memory 203a of the dequantiser 203 for the next frame. In the second and any further good speech frames, the parameters extracted in the extraction block 202 are forwarded to TFO packing and the decoding of speech parameters at the decoding block 203 continue as in normal TFO operation.

Figure 6:
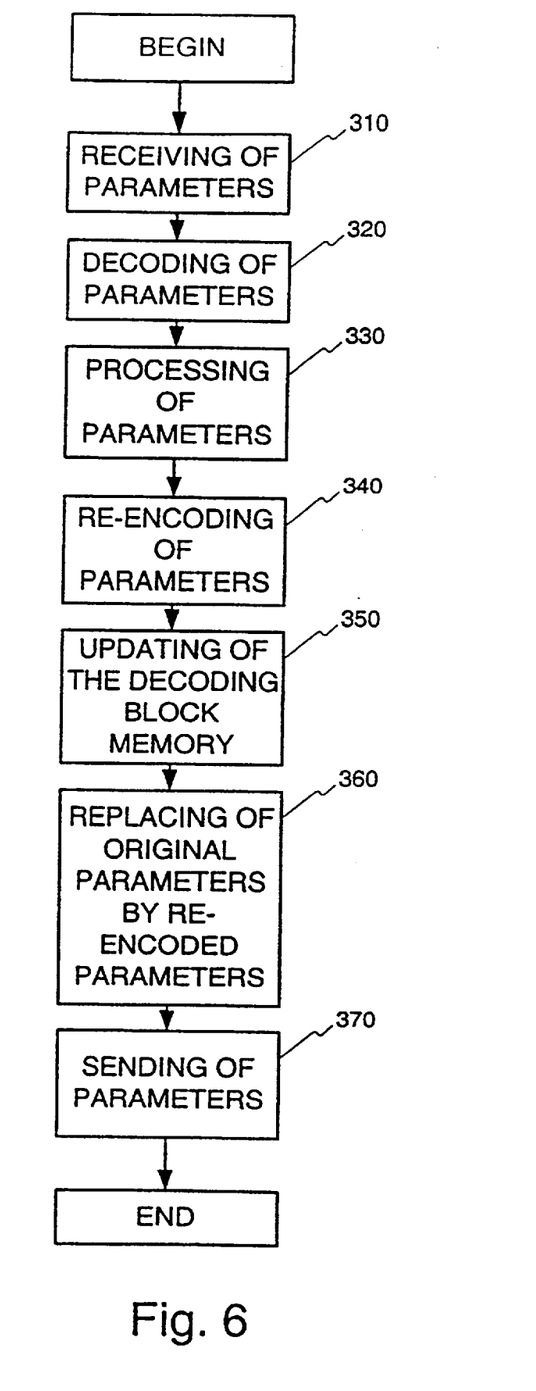
FIG. 6 shows a flow diagram of a method according to an advantageous embodiment of the invention.

FIG. 6 illustrates as an example a method according to a further advantageous embodiment of the invention. The figure illustrates a single cycle of processing a set of parameters during tandem free operation, in a BFH/CNI processing situation. First, in step 310, the parameters are received, after which the parameters are decoded in step 320. The decoded parameters are processed in step 330. In this processing step, BFH/CNI processing is performed as described elsewhere in this specification. The processed parameters are re-encoded in step 340. The state of the encoder is at least in part transferred to the decoder by updating of the decoding block memory in step 350. For further transmission of the received parameters, at least part of them are replaced by processed and re-encoded parameters in step 360, after which the parameters are transmitted further in the transmission path in step 370.

A benefit of this invention is, that it makes possible proper processing of CNI and BFH during tandem free operation, when predictive or more generally non-stateless quantisers are used in the transmitting mobile station. In prior art solutions, the combination of predictive quantisers and BFH/CNI is not possible in tandem free operation without audible and annoying artefacts.

The functional blocks implementing the method according to the invention can be located in many different network elements. The functional blocks can advantageously be located in a so-called transcoder unit (TRCU). The transcoder unit can be a standalone unit, or it can be integrated for example in a base station (BS), in a base station controller (BSC), or in a mobile switching center (MSC). However, the invention is not limited only to implementation in a transcoder unit.

The invention is not limited to such a system, where all speech parameters are encoded by predictive encoders. In a mobile telecommunications system, where only a part of speech parameters are encoded by a predictive encoder and some speech parameters are encoded by stateless encoders, a speech decoder according to an advantageous embodiment of the invention may, for example, process speech parameters encoded by stateless encoders in a way known in prior art, and predictively encoded parameters in an inventive way described previously.

The invention is not limited to the GSM system only. The GSM system is presented only as an example in this specification. The invention can be applied in any digital cellular mobile telecommunication system, such as the so-called third generation cellular systems, which were under development at the time this specification was filed.

In this specification and in the following Claims, the term "non-stateless" denotes a decoder or an encoder having functional states, i.e. being dependent in at least some degree on at least some of the previous inputs, in addition to the most recent or present input. The term "speech coding processing unit" denotes a functional entity, which decodes encoded speech parameters and/or converts the coding of encoded speech parameters from a first coding method to a second coding method.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the true spirit and scope of the invention.

What is claimed is:

1. A method for processing speech signal parameters encoded by a non-stateless encoder, characterized in that the method comprises steps of decoding the encoded speech parameters using a non-stateless decoder, processing the decoded speech parameters, re-encoding the processed decoded speech parameters using a second non-stateless encoder, updating the state of the non-stateless decoder at least in part with the state of the second non-stateless encoder, and replacing at least one encoded speech parameter with a re-encoded speech parameter to produce processed encoded speech parameters.

2. A method according to claim 1, characterized in that before said re-encoding step, the state of said second non-stateless encoder is updated with the state of the non-stateless decoder.

3. A method according to claim 1, characterized in that in said speech parameter processing step, comfort noise information is converted into the decoded speech parameters.

4. A method according to claim 1, characterized in that in said speech parameter processing step, bad frame handling information is converted into the decoded speech parameters.

5. A speech coding processing unit for decoding encoded speech parameters and producing a decoded time domain speech signal and encoded speech parameters representing the signal, characterized in that the unit comprises a non-stateless decoding block for decoding the encoded speech parameters, a speech parameter processing block for processing the decoded speech parameters, and a non-stateless encoding block for encoding the processed speech parameters for producing the encoded speech parameters representing the signal, and in that, that the unit is arranged to update the state of the non-stateless decoding block at least in part with the state of the non-stateless encoding block.

6. A speech coding processing unit according to claim 5, characterized in that said non-stateless decoding block is a predictive dequantiser, and said non-stateless encoding block is a predictive quantiser.

7. A speech coding processing unit according to claim 5, characterized in that said speech parameter processing block is a comfort noise processing block.

8. A speech coding processing unit according to claim 5, characterized in that said speech parameter processing block is a bad frame handling block.

9. A speech coding processing unit according to claim 5, characterized in that the unit is a transcoder unit.

10. A speech coding processing unit according to claim 5, characterized in that the unit is an uplink transcoder unit.

11. A telecommunications network element for receiving encoded speech parameters and transmitting a time-domain speech signal with embedded encoded speech parameters, characterized in that the network element comprises a speech coding processing unit having a non-stateless decoding block for decoding the encoded speech parameters, a speech parameter processing block for processing the decoded speech parameters, and a non-stateless encoding block for encoding the processed speech parameters for producing the the embedded encoded speech parameters, and in that, that said unit is arranged to update the state of the non-stateless decoding block at least in part with the state of the non-stateless encoding block.

12. A telecommunications network element according to claim 11, characterized in that said non-stateless decoding block is a predictive dequantiser, and said non-stateless encoding block is a predictive quantiser.

13. A telecommunications network element according to claim 11, characterized in that said speech parameter processing block is a comfort noise processing block.

14. A telecommunications network element according to claim 11, characterized in that said speech parameter processing block is a bad frame handling block.

15. A telecommunications network element according to claim 11, characterized in that said unit is a transcoder unit.

16. A telecommunications network element according to claim 11, characterized in that said unit is an uplin transcoder unit.

* * * * *

UNITED STATES PATENT AND TRADEMARK OFFICE
CERTIFICATE OF CORRECTION

PATENT NO. : 6,850,883 B1
APPLICATION NO. : 09/601827
DATED : February 1, 2005
INVENTOR(S) : Pekka Kapanen et al.

It is certified that error appears in the above-identified patent and that said Letters Patent is hereby corrected as shown below:

Title Page, please delete "(22) PCT Filed: Feb. 9, 1998" and insert
--(22) PCT Filed: Feb. 9, 1999--

Signed and Sealed this

Thirty-first Day of March, 2009

JOHN DOLL
*Acting Director of the United States Patent and Trademark Office*